United States Patent [19]

Reeve et al.

[11] Patent Number: 4,666,476
[45] Date of Patent: May 19, 1987

[54] FLUID/FLUID SEPARATORS

[75] Inventors: Thomas S. Reeve, Luton; John W. Brookes, Penn, both of England

[73] Assignee: R. Goodwin International Limited, Hanley, England

[21] Appl. No.: 767,590

[22] PCT Filed: Dec. 21, 1984

[86] PCT No.: PCT/GB84/00451
§ 371 Date: Sep. 13, 1985
§ 102(e) Date: Sep. 13, 1985

[87] PCT Pub. No.: WO85/02782
PCT Pub. Date: Jul. 4, 1985

[30] Foreign Application Priority Data

Dec. 21, 1983 [GB] United Kingdom ............... 8334075

[51] Int. Cl.4 .................................... B01D 19/00
[52] U.S. Cl. ............................ 55/203; 55/345; 55/457
[58] Field of Search ............... 55/203, 204, 345, 398, 55/399, 456, 457

[56] References Cited

U.S. PATENT DOCUMENTS

| | | | |
|---|---|---|---|
| 2,494,427 | 1/1950 | Bidwell et al. | 55/203 |
| 3,209,518 | 10/1965 | Spurgis et al. | 55/203 |
| 3,271,929 | 9/1966 | Bowden et al. | 55/203 |
| 3,641,745 | 2/1972 | Moore | 55/457 |
| 4,088,459 | 5/1978 | Tuzson | 55/203 |
| 4,482,364 | 11/1984 | Martin et al. | 55/203 X |

FOREIGN PATENT DOCUMENTS 0687343 5/1964 Canada .................... 55/203

Primary Examiner—Charles Hart
Attorney, Agent, or Firm—Fleit, Jacobson, Cohn & Price

[57] ABSTRACT

A separator for separating fluids of different densities from a mixture thereof including means to define at least one mixture flow path (80-85) which is helical or otherwise extends along and round an axis, and including a plurality of outlets (73b) from the flow path for the lighter fluid, such outlets being spaced apart along the flowpath and leading from a radially innermost part of the cross section of the flow path.

10 Claims, 4 Drawing Figures

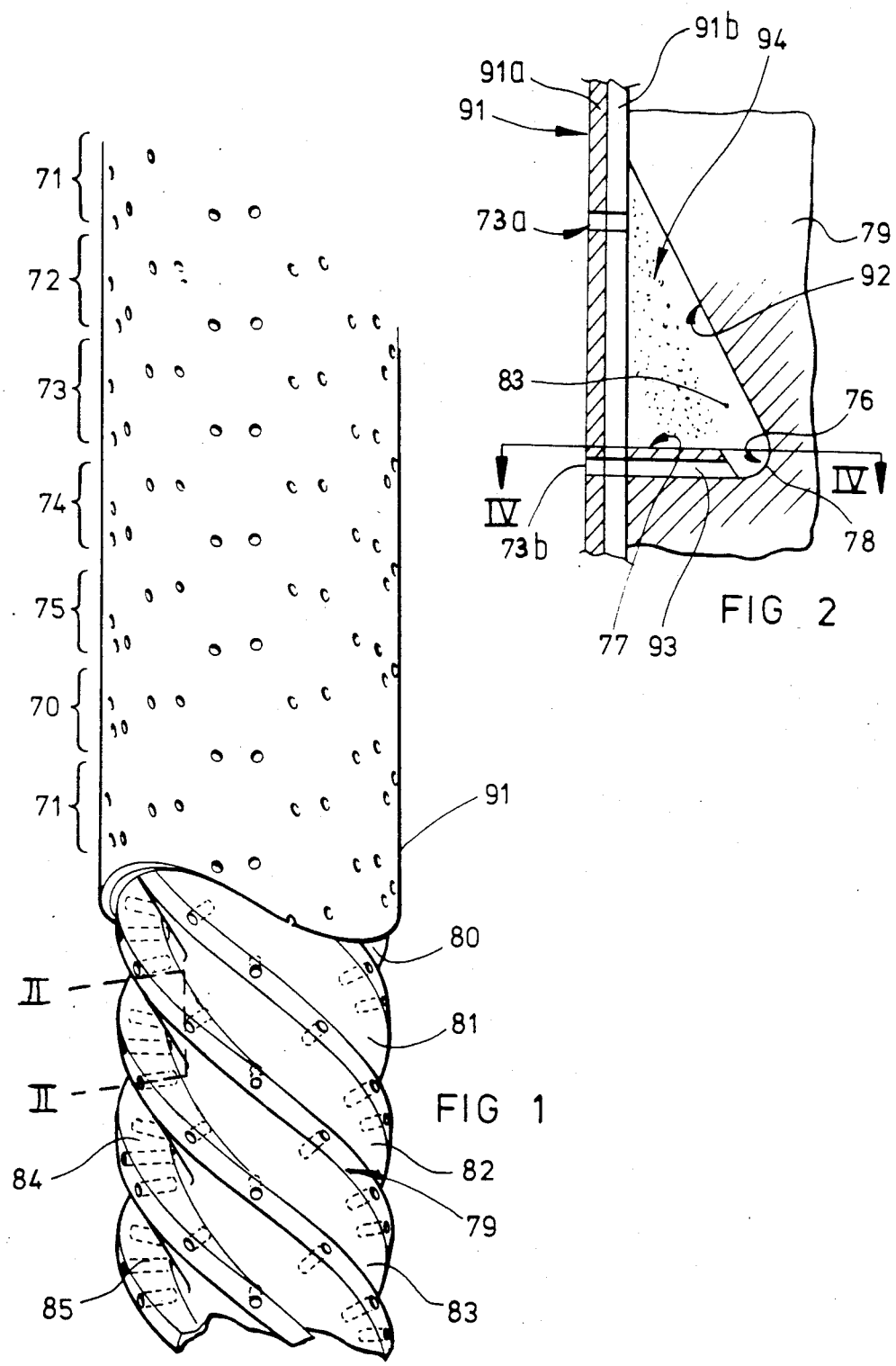

FLUID/FLUID SEPARATORS

The present invention relates to fluid/fluid separators, and in particular, though not exclusively to oil/gas separators. Separators of this invention may be used in separating oil from gas at high pressure such as at the well-head of an oil well.

British Patent Application No. 82 17798 (2 101 496) described an oil/gas separator device to be mounted at an oil well head and having a cylindrical perforated or foraminous sleeve surrounding a core having helical external channels. An oil/gas mixture flows through the channels along a helical flow path in such a way that the gas escapes through the perforations or apertures in the sleeve. One embodiment has channels of a generally triangular cross section (such cross section being in a plane including the core axis) bounded along one side of the cylindrical sleeve. The sleeve in this embodiment has holes near the top, narrow, end of the triangle for discharge of gas.

According to the present invention, there is provided a separator for separating fluids of different densities from a mixture thereof including means to define at least one mixture flow path which is helical or otherwise extends along and round an axis, and including a plurality of outlets from the flow path for the lighter fluid, such outlets being spaced apart along the flowpath and leading from a radially innermost part of the cross section of the flow path.

With the invention, a fluid mixture passed through the flow path will tend to separate due to centrifugal forces into a heavier fraction, which is radially outwards, and a lighter fraction, which is radially inwards and can be removed through the outlets. Light fraction removal can take place at points along the flow path. The heavy fraction is expected normally to exit from the flow path at the end of the separator.

Preferably, the outlets are passages extending from the radially innermost part outwardly to the exterior of the flow path. In this way the lighter fraction is removed to be outside the flow path of the heavier fraction. When collected, the light fraction can thus be easily conducted away without having to cross the flow path of the heavier fraction, which will be of particular importance if the heavier fraction entrains particles of any sort.

In preferred forms the cross section of the flow path is generally triangular. The triangle may have one radially extending side, an outer side which is, typically, parallel to said axis, and a third side inclined to said axis. If the separator is used with the axis vertical, which is preferred though not essential, because it may for instance have its axis horizontal, the radial side is preferably the base of the triangle. The radially innermost part of the flowpath is then at the inner end of the passage, and the outlet leads from there, preferably in the form of a passage formed beneath the base. Preferred embodiments also have a channel in the flow path bounded by a lip. As the mixture proceeds along the flowpath the light fraction tends to pass into the channel. The outlets lead from the channel where provided.

Preferably each outlet can be closed, or shut to an adjustable extent, so that the profile of light fraction dicharge along the length of the flow path can be controlled. The separator may comprise a core surrounded by a sleeve. The core can have one or preferably a plurality of channels cut into it to form one or a plurality of flowpaths. Preferably the sleeve is cylindrical, so that the flowpaths are spiral. The sleeve may be formed as an inner and an outer sleeve, each with apertures and being relatively rotatable to adjust the degree of overlap of the apertures.

Additional outlets from the flowpath may be provided at narrow portions thereof, for instance at the apex of the triangle when a triangular cross section is employed. This may be useful for discharging fluids such as cleaning liquids. A still further set of outlets may be provided at wide portions of the flowpath, useful for discharging heavy fluids if desired.

The outlets for the light fraction, as mentioned, open to the outside of the separator, preferably into a housing in which the separator is contained, for collection. Suitable arrangements are disclosed in the abovementioned British Patent Application.

The invention is particularly appropriate for separating gas from oil at a well head. It has been found that, at least with these fluids, effective separation can be achieved if the mixture follows a path which makes 2 or more complete turns about the axis, preferably 2½ or more. It has been found that if the path is inclined at 25° to 40°, preferably 32° to the axis, good results are obtained, though obviously variations are possible and for any given mixture, pressure, flow rate and flowpath radius a different angle may represent the optimum. Any number of flowpaths can be used on a single core, but five or six appears best, at present.

In passing up the flowpath, the mixture experiences centrifugal forces, which force the heavy fluid outwards and the light fluid inwards. With the triangular section, at least, the shape forces the light fraction down into the radially innermost corner from where the outlets lead it to the exterior. The heavy fraction tends towards the lower of the two outer corners. If there is an intermediate weight fraction this may be above the heavy one, in the upper apex of the triangle.

An advantage of the invention is in reducing foaming. Pressure can be controlled at the outlets so that no foaming occurs within the flowpath, and the absence of gas will reduce foaming in the heavy fraction as it leaves the separator.

Although envisaged primarily as an oil/gas separator, the invention is applicable to many other fluid mixtures, for instance in the dairy or foodstuff industries, in degassing fluid entrained coal particles or simply to be an anti-frothing device, for use in degassing a liquid and/or in removing bubbles of the vapour of the fluid from the fluid.

The invention will be more clearly understood from the following description which is given by way of example only with reference to the accomanying drawings in which:

FIG. 1 is an external and partly cut-away view of a separator formed in accordance with the present invention;

FIG. 2 is a partial sectional view taken in the plane shown at II—II in FIG. 1;

Figure 3:
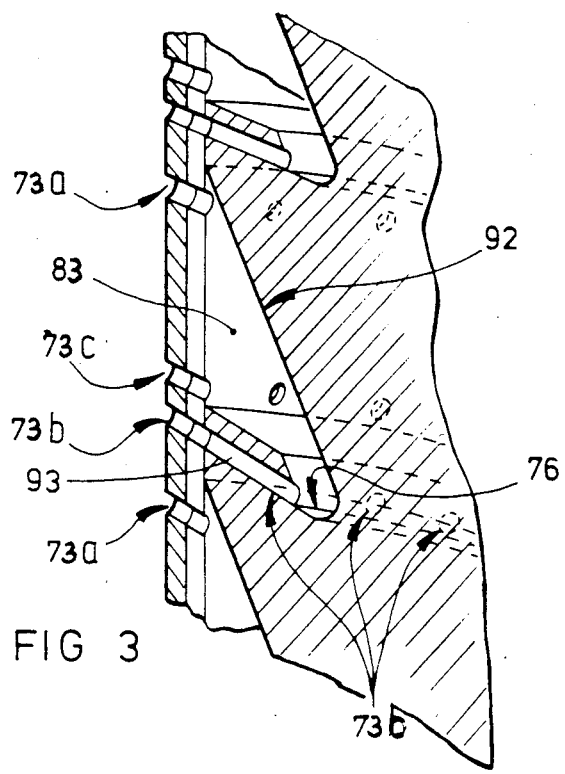
FIG. 3 is a perspective sectional view, similar to that of FIG. 2, of an alternative embodiment.

Referring first to FIG. 1, there is shown a generally cylindrical outer sleeve 91 having a helical array of apertures in its wall. The apertures are arranged in six sets 70, 71, 72, 73, 74 and 75, each set extending as a pair of rows helically around the surface of the sleeve 91 and the six sets being axially off-set.

Within the sleeve 91 is a core 79 having a set of six helical grooves 80, 81, 82, 83, 84, 85 which underlie the six sets of apertures 70-75 respectively. One of these channels is illustrated in more detail in FIG. 2, namely the groove 83 which underlies the set of apertures 73 in the sleeve 91. As can be seen from FIG. 2 the helical groove 83 has a generally trianglar cross-section defined by the inner face of the sleeve 91, a generally radial second side 77, and a third side 92 extending at an acute angle to the axis. This third side represents a sloping interior face of the groove.

At the radially innermost corner of the triangular cross-section where the side 77 approaches the inclined side 92 there is an arcuate junction 78 and a channel 76 is formed.

The holes in the set 73 comprise two rows of holes 73a, 73b. The aperture of the first row 73a is adjacent the upper corner of the triangular cross section of the groove 83 where the cross section is radially narrow, close to the point where the inclined wall 92 meets the inner face of the cylindrical surface of the sleeve 91. The apertures 73b of the second row communicate with a bore 93 parallel to the bottom wall 77 and opening into the channel 76 on the radially inner corner thereof. The inner end of the bore is in a wall of the channel 76 which wall has a lip at its top edge where the channel in effect ends and the main part of the groove begins.

In use of the separating device a mixture of gas and oil is introduced into and flows in the grooves 80-85 in the core 79 inwards of the inner face of the sleeve 91. The combination of axial and centrifugal forces causes the heavier fluid, e.g. oil, to occupy the radially outer portion of the grooves as illustrated by the dotted area in FIG. 2 identified with the reference numeral 94. The remainder of the channel section will be filled with the lighter fluid, e.g. gas under pressure which, as can be appreciated from FIG. 2, will communicate with the apertures 73b through the passages 93. Thus the light fluid, such as gas, is conducted to the outside and the heavy one continues to the top and out of the grooves.

Around the outside of the cylindrical sleeve 91 there may be provided suitable filters and baffles (not shown) for the further separation of any oil or other heavy fluid which may be entrained with the gas or lighter fraction. Such entrainment will only be slight: indeed, separation factors of up to 92 percents have been achieved using scaled down test equipment.

In some cases the oil/gas mixture may include a proportion of water. In operation of the apparatus for oil/gas separation any water entrained with the gas/oil mixture will also be thrown radially outwardly by the helical movement of the mixture through the grooves 80-85, but being of a greater density than the oil this will tend to accumulate at the outside and on the bottom, i.e. on the radial face 77. To allow this water to escape there may be provided a third row of apertures 73c located just above the wall 77. Such a configuration is shown in the embodimment of FIG. 3. The outlet 73a will in fact normally be kept closed, and indeed is not essential, though it is useful for cleaning purposes, when the grooves are flushed through with cleaning fluid.

For further control of the apparatus the sleeve 91 may, as illustrated in FIG. 2, and FIG. 3, be formed in two parts comprising an inner sleeve 91b surrounded by an out sheath 91a. The parts of the apertures, 73a, 73b, in the embodiment of FIG. 2 and 73a, 73b, 73c in the embodiment of FIG. 3 in the sleeve and sheath can then if desired be offset from one another either by relative axial movement of the two sleeve parts 91a, 91b or by relative rotational movement of the two sleeves by an amount which at most need be no more than equal to the diameter of the apertures themselves, assuming these are all of the same diameter which need not necessarily be the case. Further control may be provided if the apertures in a row are not regularly spaced, but spaced in gradually increasing or decreasing intervals which are different on the outer sheath 91a from the inner sleeve 91b so that greater turning movement and a finer control of the total available aperture area can be effected. This allows control of the escape area for the oil and gas and can be used to accommodate variations in the incoming pressure of the oil/gas mixture so that the conditions within the interior of the grooves 80-85 can be normalised despite fluctuation in the incoming pressure. Alternatively, the apertures 73a, 73b, 73c may be staggered along the helical rows so that the available aperture area per unit length of any of the grooves 80-85 varies along the axial length of the separator sleeve to take account of the fact that the gas and oil mixture entering, for example at the bottom of the apparatus will gradually be escaping through the apertures so that the pressure at the upper part of the apparatus will be less than at the lower part of the apparatus.

Although helices with a left hand thread have been illustrated in the FIG. 2, it will be appreciated that left or right hand thread helices may be used and a right hand thread helix has been shown in FIG. 3. FIG. 3, shows the form of the grooves 83, the channels 76 and the bores 93 communicating between these channels 76 and the apertures 73b in the outer sleeve 91.

Figure 4:
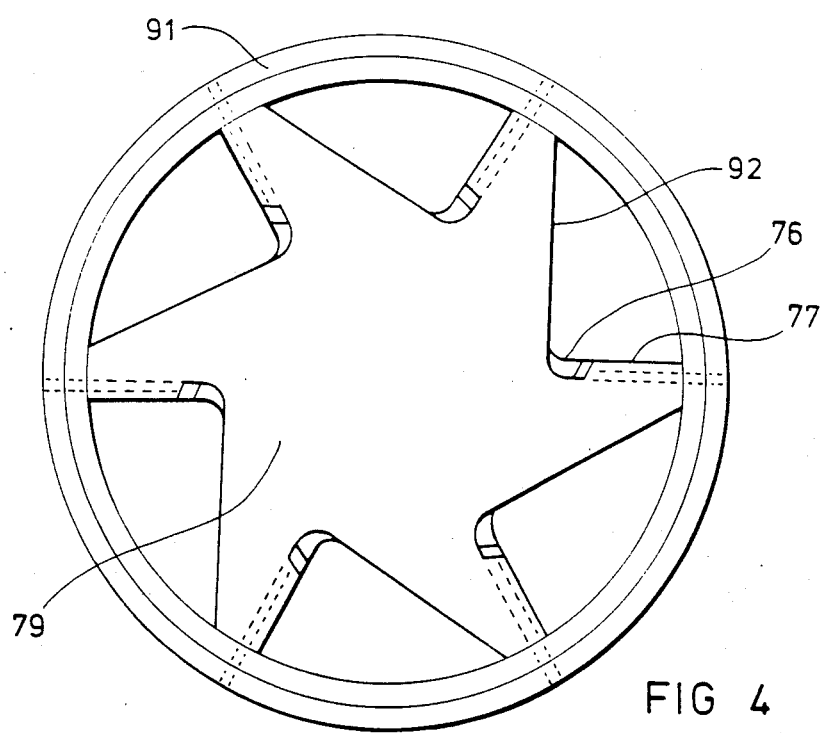
FIG. 4 is a cross-sectional view of the helical core, to an enlarged scale, and taken on the line IV—IV of FIG. 2.

FIG. 4 illustrates the cross-sectional shape of the core 79, giving an additional insight into the form of the grooves 80-85 therein and to the form of the channel 76 formed at the radially innermost part of each channel.

The separator of the invention could be used to separate solid particles of different density within a fluid.

We claim:

1. A separator for separating fluids of different densities from a mixture thereof, such separator having an axis and comprising in combination a core, at least one channel defining a mixture flow path and formed in the core, the defined flow path being helical or otherwise extending along and around the axis, means defining an outermost wall of said at least one flow path, the flow path having a cross section with a part which is radially innermost with respect to said axis, a plurality of outlets from the flow path for a lighter one of the fluids, the outlets comprising passages spaced apart along the flow path and leading from the radially innermost part of the cross section of the flow path in a radially outwards direction through the core.

2. A separator according to claim 1 wherein said means defining an outermost wall comprises at least one sleeve member provided with a plurality of apertures corresponding to at least said first mentioned plurality of outlets.

3. A separator according to claim 1 wherein said cross section of the flow path, taken in a plane including said axis, is substantially triangular.

4. A separator according to claim 3 wherein said cross section comprises one side which is generally radial with respect to said axis, an outermost side which is substantially parallel to the said axis and a third side which is inclined to said axis.

5. A separator according to claim 3 used with said axis substantially vertical and wherein the apex of said triangle is uppermost and the said outlets are at the bottom of said triangle.

6. A separator according to claim 1 further comprising a channel portion to said flow path at the radially innermost portion thereof, and a lip bounding said channel portion.

7. A separator according to claim 1 further comprising an adjustable stop for each outlet, whereby pressure along the flow path can be controlled.

8. A separator according to claim 1, further comprising a plurality of second outlets from said flow path said second outlets being spaced apart along said flow path through said sleeve and located at positions where the flow path is narrow in cross section.

9. A separator according to claim 8 including a third plurality of outlets from said flow path, said third plurality of outlets extending through said sleeve and being spaced apart along said flow path and located at positions where the flow path is wide in cross section.

10. A separator for separating fluids of different densities from a mixture thereof, such separator having an axis and comprising in combination a core, at least one channel defining a mixture flow path and formed in the core, the defined flow path being helical or otherwise extending along and around the axis, means defining an outermost wall of said at least one flow path, the flow path having a cross section with a part which is radially innermost with respect to said axis, a plurality of outlets from the flow path for a lighter one of the fluids, the outlets comprising passages spaced apart along the flow path and leading from the radially innermost part of the cross section of the flow path in a radially outwards direction through the core, said passages extending from a channel portion extending along the flow path at the radially innermost part of the flow path, in which, in use, said lighter one of the fluids collects to be discharged through said passages.

* * * * *